United States Patent
Björkén et al.

(10) Patent No.: US 9,559,795 B2
(45) Date of Patent: Jan. 31, 2017

(54) METHOD AND NETWORK NODE FOR MITIGATION OF INTERFERENCE

(71) Applicant: TELEFONAKTIEBOLAGET L M ERICSSON (PUBL), Stockholm (SE)

(72) Inventors: Peter Björkén, Solna (SE); Fredric Kronestedt, Bromma (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 14/762,701

(22) PCT Filed: Jan. 23, 2013

(86) PCT No.: PCT/SE2013/050050
§ 371 (c)(1),
(2) Date: Jul. 22, 2015

(87) PCT Pub. No.: WO2014/116149
PCT Pub. Date: Jul. 31, 2014

(65) Prior Publication Data
US 2015/0365180 A1    Dec. 17, 2015

(51) Int. Cl.
*H04B 7/00* (2006.01)
*H04B 17/309* (2015.01)
(Continued)

(52) U.S. Cl.
CPC ........... *H04B 17/309* (2015.01); *H04B 15/00* (2013.01); *H04W 16/14* (2013.01); *H04W 24/02* (2013.01); *H04W 84/042* (2013.01); *H04W 88/08* (2013.01)

(58) Field of Classification Search
CPC ............. H04W 52/146; H04W 52/243; H04W 72/082; H04B 15/00; H04B 17/345
(Continued)

(56) References Cited

U.S. PATENT DOCUMENTS 7,808,882 B2 * 10/2010 Imamura ............... H04L 5/0053
370/206
8,150,432 B2 * 4/2012 Senarath ............. H04W 52/146
370/329
(Continued)

FOREIGN PATENT DOCUMENTS

| WO | 97/07602 A1 | 2/1997 |
| WO | 2009/068727 A1 | 6/2009 |
| WO | 2012/015346 A1 | 2/2012 |

*Primary Examiner* — Sonny Trinh (57) ABSTRACT

A method and network node of a first cellular network, for enabling mitigation of interference in the first cellular network caused by radio communication in a second cellular network. The network node obtains a total interference in a first cell of the first cellular network, and estimates a first interference contribution in the first cell caused by radio communication in the first cellular network. The network node then determines a second interference contribution in the first cell caused by radio communication in the second cellular network based on the estimated first interference contribution and the obtained total interference. The network node also utilizes the determined second interference contribution to counteract the interference in the first cell caused by the radio communication in the second cellular network. Thereby, it is possible to counteract the interference in the first cell when the second interference contribution fulfills a threshold condition such that actions and measures for counteracting the inter-system interference can be initiated only when needed or when it is deemed effective for improving performance in the cell.

24 Claims, 4 Drawing Sheets

(51) Int. Cl.
  *H04W 16/14*  (2009.01)
  *H04B 15/00*  (2006.01)
  *H04W 24/02*  (2009.01)
  *H04W 84/04*  (2009.01)
  *H04W 88/08*  (2009.01)

(58) Field of Classification Search
  USPC .......... 455/63.1, 522, 524, 114.2, 278.1, 296
  See application file for complete search history.

(56) References Cited

U.S. PATENT DOCUMENTS

| | | | |
|---|---|---|---|
| 8,717,914 B2* | 5/2014 | Kim | H04L 5/0073 |
| | | | 370/252 |
| 8,725,079 B2* | 5/2014 | Wang Helmersson | H04W 16/18 |
| | | | 455/501 |
| 9,048,907 B2* | 6/2015 | Chae | H04B 7/0404 |
| 9,107,174 B2* | 8/2015 | Senarath | H04W 72/1231 |
| 9,240,850 B2* | 1/2016 | Du | H04B 17/345 |
| 2010/0267408 A1 | 10/2010 | Lee | |

\* cited by examiner

METHOD AND NETWORK NODE FOR MITIGATION OF INTERFERENCE

This application is a 371 of PCT/SE2013/050050, filed Jan. 23, 2013, the disclosure of which is fully incorporated herein by reference.

TECHNICAL FIELD

The present disclosure relates generally to a method and a network node for enabling mitigation of interference in a first cellular network caused by radio communication in a second cellular network.

BACKGROUND

In recent years, several cellular networks for wireless communication have been established to provide radio coverage for serving wireless terminals in different areas. The cellular networks are constantly developed to provide increasingly better coverage and capacity to meet the demands from subscribers using services and advanced terminals, e.g. smartphones and tablets, which require more and more bandwidth and resources for data transport. As a result, it is common to configure a network with different cell sizes to provide needed capacity and flexibility depending on expected traffic intensity in different areas, commonly referred to as a heterogeneous network. Such a network typically comprises hierarchical cell structures including large macro cells covering relatively large areas of kilometer size, and also smaller cells of a few meters size, e.g. micro cells, pico cells and femto cells, to mention some customary examples. The smaller cells are added to the macro cells in an overlapping fashion to increase the capacity locally in so-called "hot spot" areas.

In this disclosure, the term base station represents a radio node of a cellular or mobile network which node is capable of communicating with wireless terminals over radio channels. Depending on the terminology used, a base station may also be called NodeB, eNodeB, eNB, base transceiver station, and so forth. Further, the term "terminal" represents any wireless terminal or device capable of radio communication with a base station in a cellular network.

The different types of cells mentioned above thus have base stations serving mobile terminals to enable radio transmissions in the cells, including downlink signals from the base stations to the terminals and uplink signals from the terminals to the base stations. It can easily be understood that in a large cell, high transmission power is required due to the relatively long distances between the communicating nodes, i.e. between terminals and their serving base stations, while considerably lower transmission power is sufficient in a small cell since the communicating nodes are closer to one another.

Interference is a well-known problem that occurs when nearby radio transmissions disturb the reception of downlink signals in a terminal or uplink signals in a base station. The interfering nearby radio transmissions may contain data and/or control information. So-called inter-cell interference occurs when transmissions in one cell disturb signal reception in another adjacent cell. Numerous solutions exist for avoiding such interference e.g. by coordinating transmissions in adjacent cells and/or by configuring the radio coverage of the cells within a network. It is also possible to change base station antenna azimuth, apply filters, etc., to reduce or avoid interfering signals at the receiver.

Figure 1A:
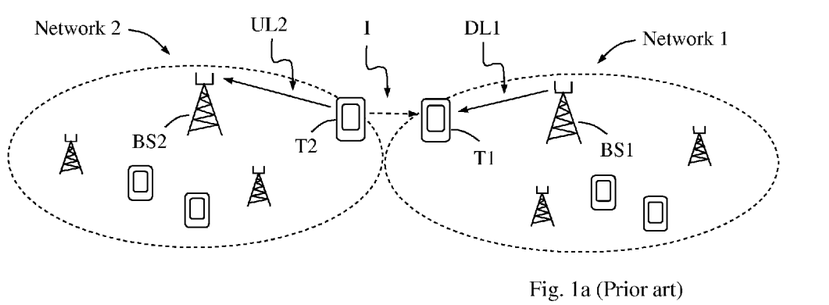
FIG. 1a-c are some exemplifying communication scenarios illustrating how inter-system interference can occur in conventional cellular networks.
Figure 1B:
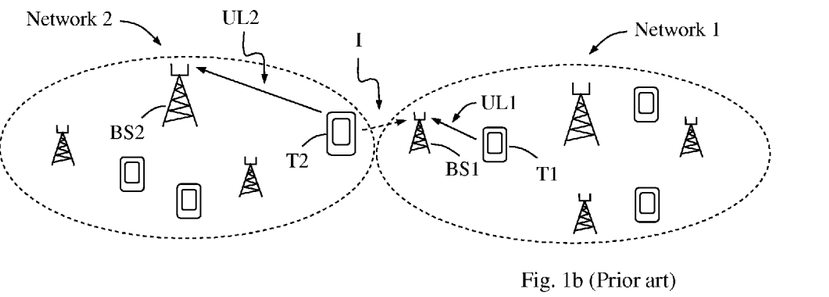
Figure 1C:
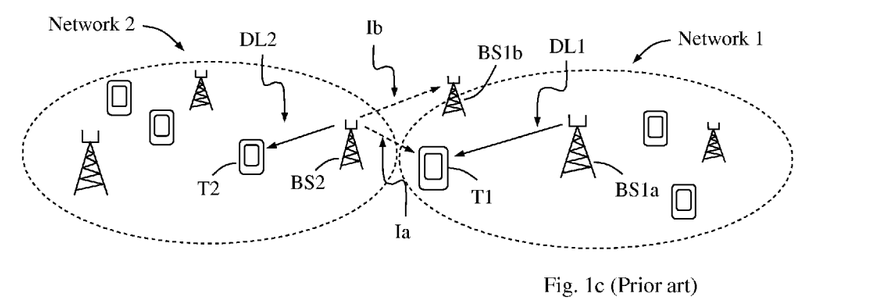

However, more than one cellular network may cover basically the same area or adjacent areas, e.g. different networks controlled by different operators, and it may be a problem that radio transmissions in one network can cause interference to signal reception in another network, which can be referred to as "inter-system interference" or "inter-network interference". Some examples of how such inter-system interference can occur are illustrated in FIGS. 1a-1c, where reception of signals in a first cellular network "1" is interfered by transmission in another cellular network "2". In this respect, networks 1 and 2 can be seen as a "victim" network and an "aggressor" network, respectively, even though interference may at the same time arise in the opposite direction from network 1 to network 2 as well. In this simplified illustration, the networks 1 and 2 are shown geographically apart from one another although in reality they may have more or less overlapping coverage areas. Further, the networks 1 and 2 may have a mix of large and small cells, schematically suggested by small and large base stations in the figure, where the cells may be arranged in a hierarchical fashion and there is typically no coordination of cell configurations between different networks.

In a first example scenario shown in FIG. 1a, a terminal T2 in the aggressor network 2 sends uplink signals UL2 to a serving base station BS2, while at the same time a terminal T1 in the victim network 1 receives downlink signals DL1 from a serving base station BS1. In this case, the terminals T1 and T2 happen to be close to one another while terminal T2 is relatively far away from its serving base station BS2, e.g. in a macro cell, and T2 must therefore transmit its uplink signals UL2 with quite high power. This transmission therefore causes interference "I", indicated by a dashed arrow, to the reception of downlink signals DL1 in the nearby terminal T1.

In a second example scenario shown in FIG. 1b, a terminal T2 in the aggressor network 2 likewise sends uplink signals UL2 to a base station BS2, while at the same time a base station BS1 in the victim network 1 receives uplink signals UL1 from a terminal T1. In this case, terminal T2 happens to be close to base station BS1 but far away from its serving base station BS2, e.g. in a macro cell, and T2 must therefore transmit its uplink signals UL2 with quite high power. This transmission therefore causes interference "I" to the reception of uplink signals UL1 in base station BS1. This interference may be particularly severe in case the base station BS1 has its antenna, e.g. mounted on top of a tower or on a wall, close to the ground where terminal T2 is situated.

In a third example scenario shown in FIG. 1c, a base station BS2 in the aggressor network 2 sends downlink signals DL2 to a terminal T2, while at the same time a terminal T1 in the victim network 1 receives downlink signals DL1 from a base station BS1a. In this case, terminal T1 happens to be close to base station BS2 which is far away from the served terminal T2, e.g. in a macro cell, and BS2 must therefore transmit its downlink signals DL2 with quite high power. This transmission therefore causes interference "Ia" to the reception of downlink signals DL1 in terminal T1 and may also cause interference "Ib" in another base station BS1b in the victim network 1, if BS1b is located close enough to BS2. As in FIG. 2, the interference Ia may be particularly severe if BS1 has a low tower with its antenna close to the ground where T1 is situated. Further, if base station BS1b in FIG. 1c, or base station BS1 in FIG. 1b, serves a small cell, e.g. a micro, pico or femto cell, it may have a relatively small and rudimentary receiver with reduced hardware requirements making it sensitive to interference, thus heightening the problem of inter-system interference.

Normally, two networks controlled by different operators use different parts or frequency ranges of the radio spectrum, referred to as allocated bandwidth, such that no transmission should occur on the same frequency in two networks. Nevertheless, radio transmission within a certain frequency range typically means that energy is also emitted to some extent on contiguous frequencies outside, i.e. below and above, the used frequency range, which may cause so-called "out-of-band" interference from one network to another, which is illustrated by a power-frequency diagram in FIG. 2. This shows that one output power distribution over frequency used in an aggressor network, shown by a full line 200, can cause potentially harmful interference in a victim network using another output power distribution over frequency, shown by a dashed line 202.

Figure 2:
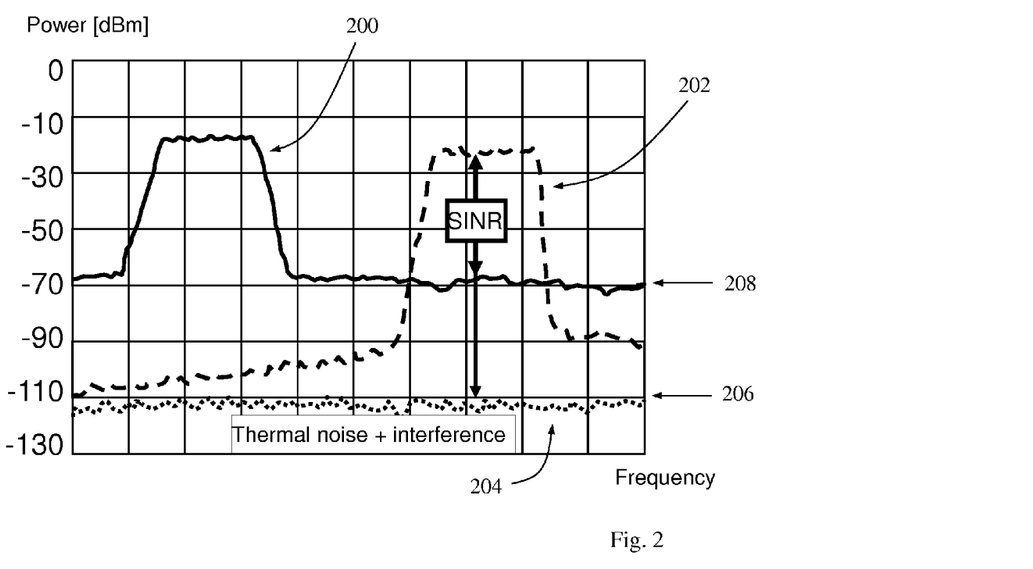
FIG. 2 is a power-frequency diagram illustrating how inter-system interference can deteriorate performance in a conventional victim network.

Even though the two networks transmit most of their power in separated frequency ranges, i.e. within their respective allocated bandwidths which are separated from one another, some power from the aggressor network still "leaks out" out-of-band coinciding with the frequency range allocated to the victim network. As a result, the "noise floor" experienced in the victim network, shown by a dotted line 204, is raised from a background level 206 of thermal noise and own interference to the level of a power 208 leaked from the aggressor network, such that the Signal-to-Interference and Noise Ratio (SINR) is reduced which in turn can deteriorate quality, coverage and capacity in the victim network. As mentioned above, both of two neighboring networks can suffer from such inter-system interference from one another at the same time, so the above explanation and examples may be valid in both directions. It is thus a problem that the cause for such a reduced performance due to inter-system interference is difficult to detect and that it may be a waste of resources and efforts to take actions for reducing inter-system interference when not really needed.

SUMMARY

It is an object of embodiments described herein to address at least some of the problems and issues outlined above. It is possible to achieve these objects and others by using a method and a network node as defined in the attached independent claims.

According to one aspect, a method is provided in a network node of a first cellular network for enabling mitigation of interference in the first cellular network caused by radio communication in a second cellular network. In this method, the network node obtains a total interference in a first cell of the first cellular network, and estimates a first interference contribution in the first cell caused by radio communication in the first cellular network. The network node then determines a second interference contribution in the first cell caused by radio communication in the second cellular network based on the estimated first interference contribution and the obtained total interference.

The network node also utilizes the determined second interference contribution to counteract the interference in the first cell caused by the radio communication in the second cellular network. Thereby, it is possible to counteract the interference in the first cell when the second interference contribution fulfills a threshold condition such that actions and measures for counteracting the inter-system interference can be initiated only when needed or when it is deemed effective for improving performance in the cell.

According to another aspect, a network node of a first cellular network is provided. The network node is configured to enable mitigation of interference in the first cellular network caused by radio communication in a second cellular network. The network node comprises an obtaining unit adapted to obtain a total interference in a first cell of the first cellular network, and an estimating unit adapted to estimate a first interference contribution in the first cell caused by radio communication in the first cellular network.

The network node also comprises a logic unit adapted to determine a second interference contribution in the first cell caused by radio communication in the second cellular network based on the estimated first interference contribution and the obtained total interference. The network node further comprises a utilizing unit adapted to utilize the determined second interference contribution to counteract the interference in the first cell caused by the radio communication in the second cellular network.

The above method and network node may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to enable efficient usage of various actions and measures to counteract the above-described inter-system interference in a cell of one cellular network caused by radio communication in another neighboring cellular network which thus is an aggressor network in this context while the former network is the victim network. In this solution, it is recognized that the total interference experienced in a cell comprises contributions from radio communication in the own network and in the other network. It should be noted that the following description is valid for radio communication with both uplink and downlink transmissions in either network and the solution is not limited in this respect.

The total interference in a cell can be obtained based on measurements by nodes and terminals in the cell, i.e. on the uplink or the downlink or both, and the contribution of interference from the own network can also be determined in various ways, e.g. by measurements made by terminals in the own cell on downlink signals from neighbor cells, which will be explained in more detail below. By knowing the total experienced interference and the contribution from the own network, the contribution of interference from the other network in the cell can then be determined, e.g. as the difference between the total interference and the contribution from the own network. As said above, any transmissions in the own network and the other aggressor network causing interference in the first cell may contain data and/or control information.

For example, the contribution of interference from the other network may be determined as being equal to the total interference during periods when no transmissions are scheduled in neighboring cells in the own network, i.e. when knowing that the own network is "silent" in downlink and/or uplink, at least as perceived in the current cell, and the contribution therefrom can be estimated as substantially zero. Although there may be transmissions going on farther away in the own network, it may be known that this does not cause interference in the current cell during such periods. The determined interference contribution from the other network can be utilized for counteracting the inter-system interference in the first cell in a fitting manner, e.g. when the second interference contribution fulfills a predefined threshold condition. If not, the inter-system interference may be deemed not harmful enough to reduce the performance anyway and any actions and measures for counteracting the inter-system interference would be pointless in that case.

In this way, actions and measures for counteracting the inter-system interference can be initiated only when needed or when it is deemed effective for improving performance in the cell, e.g. in view of quality, coverage and/or capacity. There are different possible actions and measures that can be made to counteract the inter-system interference once the interference contribution from the neighboring network has been determined. For example, the own network may be re-configured for alleviating the inter-system interference, e.g. by changing the disposition of cells and/or moving base stations away from the interfering nodes. The base station serving the cell may also change its operation, e.g. in terms of cell coverage, power levels, antenna position, antenna azimuth and/or tilt, filter settings, usage of transmission modes and schemes, transmission scheduling, and so forth. Some possible examples of such actions and measures will be outlined in more detail later below.

Figure 3:
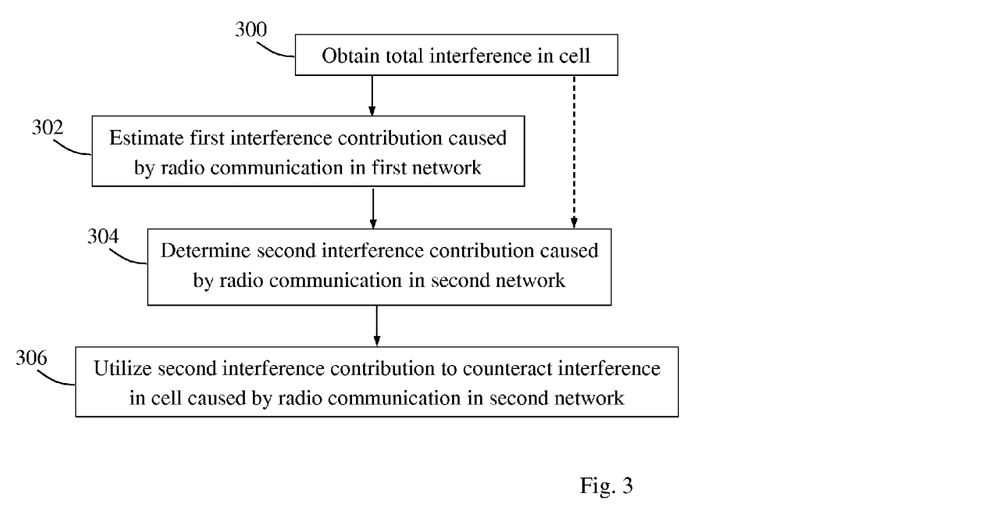
FIG. 3 is a flow chart illustrating a procedure in a network node of a first cellular network, according to some possible embodiments.

A procedure with actions performed by a network node of a first cellular network, for enabling mitigation of interference in the first network caused by radio communication in a second cellular network, will now be described with reference to the flow chart in FIG. 3. The network node in this procedure may be a base station or the like serving a first cell in the network, or a network management node connected to a base station serving the first cell. It should be noted that although this procedure is described in view of inter-system interference caused by transmissions in a single neighboring network being the aggressor network, the following actions and features can be valid also when more than one neighboring aggressor network are causing inter-system interference in the first network, depending on how many networks are active in the neighborhood of the first cell discussed here. Therefore, the term "a second cellular network" should be understood as at least one network.

A first shown action 300 illustrates that the network node obtains a total interference in a first cell of the first cellular network. In this action, the total interference may be obtained from signal measurements in the first cell, such as uplink measurements made by the base station and/or downlink measurements made by terminals connected to the base station when present in the cell. These measurements can be made over time to provide a reliable and representative result that adequately indicates the overall interference experienced in the cell. The measurements may further be made during idle periods when no terminals are scheduled for radio communication in the first cell on the uplink and/or downlink, to facilitate the following actions. On the other hand, it is also possible to measure and determine the total interference when there are transmissions going on in the first cell.

In a further action 302, the network node estimates a first interference contribution in the first cell caused by radio communication in the first cellular network. In this action, estimation of the first interference contribution may be facilitated if it is made in idle periods when no terminals are scheduled for radio communication in the first cell, thus avoiding any transmissions in the cell such that all measured signals are interfering signals. Further, the first interference contribution can be estimated to be zero during periods when no terminals are scheduled for radio communication in neighbor cells of the first cellular network adjacent to the first cell. In this case, it is sufficient to know that no terminals are being scheduled in the neighbor cells of the first cellular network that might potentially cause "intra-system" interference in the first cell.

The above described "periods" may be any suitable time periods or intervals comprising one or more so-called Time Transmission Intervals (TTIs) such as, e.g., time slots, subframes or radio frames, depending on what terminology and time scheme is used for scheduling radio transmissions in the first network on the uplink and/or downlink. The solution is thus not limited to any particular type of time periods in this regard.

In a further action 304, the network node determines a second interference contribution in the first cell caused by radio communication in the second cellular network based on the estimated first interference contribution and the obtained total interference. In one possible embodiment, the second interference contribution can be determined by calculating the difference or ratio between the estimated first interference contribution and the obtained total interference. For example, if the first interference contribution can be estimated to be zero as described above, the second interference contribution is deemed to be substantially equal to the total interference in the first cell obtained in action 300 since all interference experienced in the first cell must come from radio transmissions in the second network and not the first network. This option is schematically indicated by a dashed arrow pointing directly from action 300 to action 304 implying that no measurements or the like are needed in action 302 to estimate the first interference contribution when simply knowing that there should be no transmissions in the neighbor cells of the first cellular network.

A final shown action 306 illustrates that the network node utilizes the determined second interference contribution to counteract the interference in the first cell caused by the radio communication in the second cellular network, i.e. the inter-system interference. As mentioned above, different actions and measures are possible to perform in order to counteract the above inter-system interference, which will be described in more detail later below particularly with reference to FIGS. 6 and 7.

In another possible embodiment, the above action 306 may be triggered when detecting that the second interference contribution fulfills a threshold condition that may have been predefined in a suitable manner such that the second interference contribution is utilized to counteract the inter-system interference in the first cell only when warranted and justified to improve the performance of the first network. For example, the threshold condition may comprise any of: a minimum limit of the second interference contribution, a minimum ratio of the second interference contribution and the first interference contribution, a minimum ratio of the second interference contribution and the total interference, and a minimum level of influence of the interference on communication performance in the first cell. In these examples, the inter-system interference can be counteracted basically when the second interference contribution is deemed strong enough to be harmful for the performance, i.e. when the threshold condition is fulfilled.

In another possible embodiment, the threshold condition may be adaptive depending on traffic load in the first cell, e.g. such that the second interference contribution is allowed to be higher before triggering the counteraction of inter-system interference when the traffic load is low, and vice versa. This could be an advantage since the need for counteracting the inter-system interference is greater at high traffic load due to high utilization of available resources, bandwidth and channels which makes the ongoing communications more sensitive to the interference.

The threshold condition may thus be defined such that the inter-system interference will not be counteracted unnecessarily which could be beneficial since any actions and measures to counteract inter-system interference can be more or less costly in terms of efforts and equipment. The resulting net performance may even be reduced by certain counteracting measures if they cause more harm than improvement in the first network. For example, if the first cell's coverage is reduced to counteract the interference in that cell, some terminals near the cell's border may have to be served by neighboring cells instead, thus increasing the load there, and the net result of coverage, capacity and/or quality in the network may even be negative if the threshold is set too low such that the negative effects outweigh the positive effects. On the other hand, if the threshold is set too high, the negative effects of the inter-system interference may be harmful for the performance without any counteracting actions and measures being made when the threshold condition is not quite fulfilled. It should thus be possible to "tune" the threshold condition to heighten and even optimize the improvement.

Figure 4:
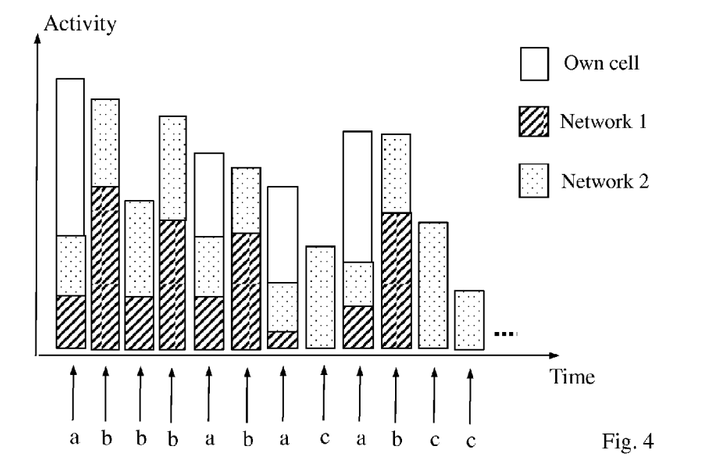
FIG. 4 is an activity-time diagram illustrating an example of how different transmission activities can be determined over time, according to further possible embodiments.

FIG. 4 is a schematic diagram illustrating an example of how a signal level resulting from transmission activities in a first cell, in neighboring cells of a first network and in a second aggressor network may vary over time in different time intervals, e.g. TTIs. These transmission activities may include radio transmissions in uplink, downlink or both. In this diagram, the blank areas represent the signal level resulting from transmission activities in the first cell, the striped areas represent the signal level resulting from transmission activities in the first network causing the above-described first interference contribution, and the dotted areas represent the signal level resulting from transmission activities in the second network causing the above-described second interference contribution in the first cell. In TTIs marked "a", there are transmissions going on in the first cell, in the neighboring cells of the first network and in the second network. In TTIs marked "b", there are transmissions going on only in the neighboring cells of the first network and in the second network, but not in the first cell, and in TTIs marked "c", there are transmissions going on only in the second network but not in the first cell nor in the neighboring cells of the first network. Other combinations may also occur, not shown, such as transmissions only in the first cell or only in the first network or in both. For this solution however, it is useful to consider the TTIs marked a, b and c with transmission activities at least in the second network.

In one possible embodiment, obtaining the total interference in action 300 and estimating the first interference contribution in action 302 may be performed in idle periods when no terminal is scheduled for radio communication in the first cell, i.e. in any of the TTIs marked b and c in FIG. 4. In that case, the total interference can easily be measured as the total received power at the base station serving the first cell. In another possible embodiment, the first interference contribution may be estimated in action 302 to be zero during periods when it is known that no terminals are scheduled for radio communication in the first cell nor in the neighbor cells of the first cellular network, i.e. in the TTIs marked c in FIG. 4. In that case, it can be assumed that the total received power at the base station during those TTIs comes from transmissions in the second network only, i.e. equaling the second interference contribution. As said above, it is also possible to measure and determine the total interference when there are transmissions going on in the first cell. As also mentioned above, there may be more than one "second" network in this context causing the inter-system interference and the embodiments described herein can be used in that case as well.

In further possible embodiments, the total interference may be obtained by signal measurements in the first cell, either on the uplink measured by the base station of the first cell or on the downlink as measured and reported by terminals in the cell, and the first interference contribution in the first cell may be estimated based on at least one interference indication from at least one neighbor cell of the first network. Such interference indications may generally be exchanged between base stations of a network, e.g. over an X2 interface typically used in Long Term Evolution (LTE) networks. For example, the at least one interference indication received from a base station of the neighbor cell may comprise at least one of: a bitmap of TTIs scheduled for terminals in the neighbor cell, i.e. where interference from the transmissions may occur, a parameter called High Interference Indicator (HII), indicating high expected interference caused by transmissions scheduled in the neighbor cell, analysis of downlink measurements, and analysis of uplink signal levels derived from neighbor cell measurements of uplink signals. The HII parameter has been specified in 3GPP for LTE.

In the latter option, the analysis of uplink signal levels may be performed in the neighbor cell as follows. The base station of the neighbor cell, here referred to as the neighbor base station, normally receives neighbor cell measurements of uplink signals from terminals in the neighbor cell including a received power of downlink signals. The neighbor base station may further estimate or receive reports of the power used by the terminals for uplink transmissions in the neighbor cell. Estimations can then be made from path loss values by the terminals on their own signal and parameter settings of power used.

The neighbor base station may further determine the uplink interference caused by each terminal at the base station of the first cell based on the terminal's neighbor cell measurements on signals from the first cell which may be a potential target cell for handover from the neighbor cell. The uplink interference can be calculated as:

$$\text{uplink interference} = \text{power} * \text{path gain} \quad (1)$$

where the path gain, in linear scale, is effectively a "negative" path loss and can be calculated as the transmit power used in the own cell minus the downlink signal level measurement in the neighbor cell. The neighbor base station may send the determined uplink interference to the first base station. Alternatively, the neighbor base station may send the neighbor cell measurements and used power to the first base station which can determine the uplink interference itself and path loss as above.

Figure 5:
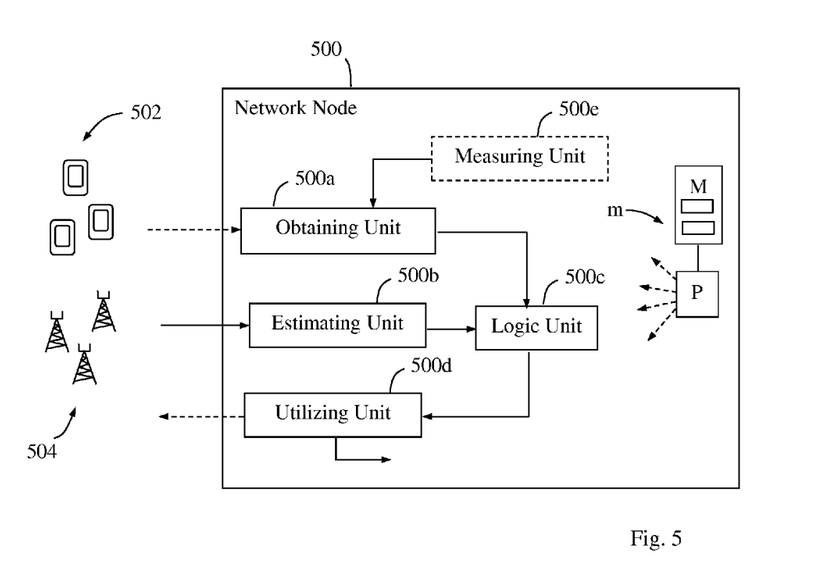
FIG. 5 is a block diagram illustrating a network node in more detail when used in practice, according to further possible embodiments.

A detailed but non-limiting example of how a network node may be arranged with some possible functional units to accomplish the above-described embodiments is illustrated by the block diagram in FIG. 5. The network node 500 is configured to enable mitigation of interference in the first cellular network caused by radio communication in a second cellular network, the latter thus being an aggressor network not shown in this figure. The network node 500 may act according to the procedures and features described above for any of FIGS. 3 and 4 and the examples shown in FIGS. 6 and 7 to be described further below. Some terminals 502 and base stations 504 in the first network are also schematically indicated in the figure which may interact with the network node 500 as shown by various arrows, depending on the implementation. The network node 500 and its functional units will now be described in terms of a possible example of employing the solution.

The network node 500 comprises an obtaining unit 500a adapted to obtain a total interference in a first cell of the first cellular network, e.g. in the manner described for action 300 above. The network node 500 also comprises an estimating unit 500b adapted to estimate a first interference contribution in the first cell caused by radio communication in the first cellular network, e.g. in the manner described for action 302 above.

The network node 500 also comprises a logic unit 500c adapted to determine a second interference contribution in the first cell caused by radio communication in the second cellular network based on the estimated first interference contribution and the obtained total interference, e.g. in the manner described for action 304 above. The network node 500 also comprises a utilizing unit 500d adapted to utilize the determined second interference contribution to counteract the interference in the first cell caused by the radio communication in the second cellular network, e.g. in the manner described for action 306 above.

The network node 500 may be a base station serving the first cell or a network management node connected to a base station serving the first cell. When network node 500 is a base station, it may also comprise a measuring unit 500e for performing various measurements of interference and signals, as needed to implement any of the embodiments and features described herein.

It should be noted that FIG. 5 illustrates various functional units in the network node 500 and the skilled person is able to implement these functional units in practice using suitable software and hardware. Thus, the solution is generally not limited to the shown structures of the network node 500, and the functional units 500a-d may be configured to operate according to any of the features described in this disclosure, where appropriate.

The functional units 500a-d described above can be implemented in the network node 500 by means of program modules of a respective computer program comprising code means which, when run by a processor "P" causes the network node 500 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the network node 500 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the network node 500.

Figure 6:
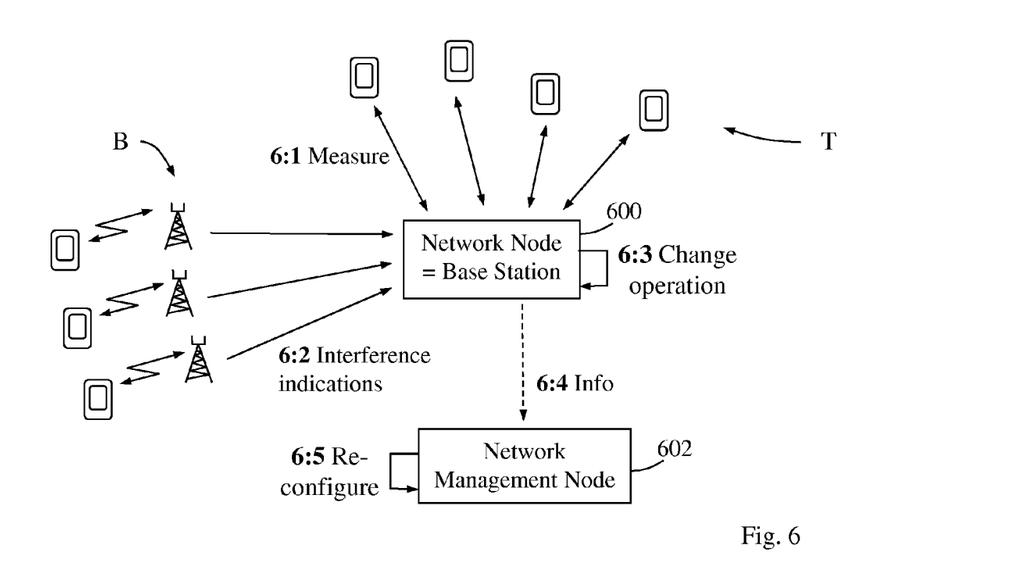
FIG. 6 is a communication scenario illustrating a network node in operation when being a base station, according to further possible embodiments.

An example of how the above network node may operate in practice in the case of being a base station serving a first cell, will now be described in more detail with reference to FIG. 6. As in the previous examples, it is assumed that a second cellular network causes inter-system interference in the first cell. The base station 600 is configured to perform interference measurements and/or to receive measurement reports from terminals "T" present in the first cell, as illustrated by an action 6:1, which measurements can be used e.g. for obtaining the total interference, as described in action 300 above.

The base station 600 is also configured to obtain at least one interference indication from at least one neighbor cell "B", as illustrated by another action 6:2, which interference indication may e.g. comprise any of the above-mentioned bitmap of scheduled TTIs, parameter HII, analysis of downlink measurements, and analysis of uplink signal levels. The interference indication(s) can thus be used by the base station 600 for estimating the first interference contribution in the first cell, as described in action 302 above.

Having obtained the total interference and estimated the first interference contribution, the base station 600 is able to determine the second interference contribution in the first cell based on this information, as described in action 304 above. The base station 600 may then utilize the second interference contribution to counteract the interference in the first cell, e.g. when the second interference contribution fulfills a threshold condition if used, as described in action 306 above. This may be done basically in two ways. Firstly, the base station 600 has a variety of options to change its operation in a suitable manner for alleviating the interference from the second network, as indicated by an action 6:3. This may thus be done in different ways according to any of the following examples.

The base station 600 may change its antenna azimuth and/or tilt to receive less interference, which is a well-known technique as such for reducing interference. For example, the antenna azimuth and/or tilt may be changed mechanically or electrically according to conventional procedures, and either manually by a person at the site or remote from a control center or the like. The base station 600 may further apply a receiver filter to suppress the received interference, e.g. to filter away any out-of-band signals, which can occur as illustrated in FIG. 2, presumably coming from the second network. Another option is that the base station 600 may change the coverage area of the first cell, e.g. by moving its cell border closer to the cell center which can be done by changing power and handover settings. As a result, any terminal situated close to the cell border and thus being particularly sensitive to the interference due to the relatively long distance to the base station, will instead be connected to an adjacent cell with less interference problems.

Further possible options include adjusting transmission power for communications in the first cell, changing transmission mode in the base station, avoiding connection of terminals with "deficient" receivers, and using a more robust modulation and/or coding scheme for communications in the first cell. These latter options may result in better and more reliable reception and decoding of signals in receivers at either the terminals or the base station, i.e. the changed operation of base station 600 may be effective for both uplink and downlink communication. It should be noted that any number of the above-described options may be used by the base station 600 to change its operation and the solution is not limited in this respect.

Secondly, the base station 600 may alternatively or additionally send information about the determined second interference contribution to a network management node 602, shown by another action 6:4, to enable re-configuration of the first cellular network for alleviating the interference from the second cellular network. A final action 6:5 illustrates that the network management node 602 in that case performs a suitable re-configuration of the first network upon receiving the information, which may involve the first cell and possibly also further nearby cells. For example, this information may be a simple notification or alarm sent to node 602 after detecting that the second interference contribution fulfills a threshold condition, as described above. Alternatively, the information may comprise the determined second interference contribution which is sent to let the network management node 602 decide if the second interference contribution is large enough to warrant any re-configuration of the first cellular network. Such re-configuration may include changing various parameters and/or base station positions in the network to achieve better resistance to inter-system interference.

Figure 7:
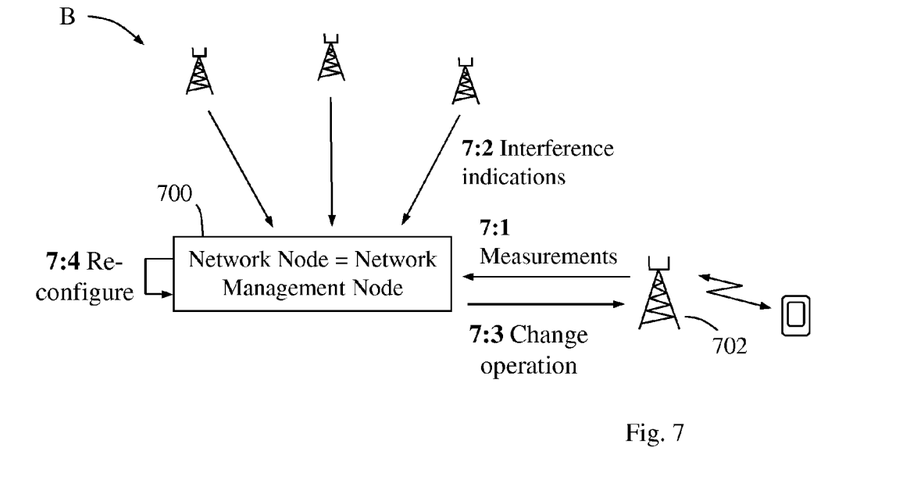
FIG. 7 is another communication scenario illustrating a network node in operation when being a network management node, according to further possible embodiments.

Another detailed example of how the above network node may operate in practice in the case of being a network management node connected to a base station serving a first cell, will now be described in with reference to FIG. 7. Again, it is assumed that a second network causes inter-system interference in the first cell. The network management node 700 is configured to receive signal measurement results from the base station 702, as illustrated by an action 7:1, which measurements can be used e.g. for obtaining the total interference, as described in action 300.

The network management node 700 is also configured to obtain interference indications from base stations of neighbor cells "B" of the first network, as illustrated by another action 7:2. The interference indications may be any of those described above and can thus be used by the network management node 700 for estimating the first interference contribution in the first cell, as described in action 302. Having obtained the total interference and estimated the first interference contribution, the network management node 700 is able to determine the second interference contribution in the first cell based on this information, as described in action 304.

The network management node 700 then utilizes the determined second interference contribution to counteract the interference in the first cell, e.g. when the second interference contribution fulfills a threshold condition if used, as described in action 306 above. This may be done basically in two ways as follows. Firstly, the network management node 700 may order, or instruct, the base station 702 to change its operation for alleviating the interference from the second cellular network, as indicated by an action 7:3. In turn, the base station 702 may then change its operation in some way according to any of the options described above for action 6:3. Secondly, the network management node 700 may re-configure the first cellular network for alleviating the interference from the second cellular network, as illustrated by another action 7:4. This may be done as described above for action 6:5.

The above-described actions in any of FIGS. 3-7 may be performed at predetermined intervals or when triggered by an event which indicates a need for mitigation of interference in the first network caused by radio communication in the second aggressor network. This event may occur when detecting that the total interference in the cell exceeds a predefined value, or when detecting that the communication performance in the first cell falls below a predefined level. Both of these triggering events may be applied jointly and also in combination with using predetermined intervals.

Returning to FIG. 5, the network node 500 and its functional units 500*a-e* may be configured or adapted to operate according to various optional embodiments as described above. In a possible embodiment, the logic unit 500*c* may be further adapted to determine the second interference contribution by calculating the difference or ratio between the estimated first interference contribution and the obtained total interference. In another embodiment, the utilizing unit 500*d* may be further adapted to utilize the second interference contribution to counteract the interference in the first cell when the second interference contribution fulfills a threshold condition.

In another possible embodiment, the obtaining unit 500*a* and the estimating unit 500*b* may be adapted to obtain the total interference and estimate the first interference contribution, respectively, for idle periods when no terminal is scheduled for radio communication in the first cell, such as the TTIs b and c in FIG. 4. The estimating unit 500*b* may be further adapted to estimate the first interference contribution to be zero during periods when no terminals are scheduled for radio communication in neighbor cells of the first cellular network adjacent to the first cell, such as the TTIs c in FIG. 4.

In further possible embodiments, the obtaining unit 500*a* may be adapted to obtain the total interference from signal measurements in the first cell, and the estimating unit 500*b* may be adapted to estimate the first interference contribution in the first cell based on at least one interference indication from at least one neighbor cell.

In the case when the network node is a base station serving the first cell, the utilizing unit 500*d* may be further adapted to utilize the determined second interference contribution by at least one of: A) sending information about the determined second interference contribution to a network management node to enable re-configuration of the first cellular network for alleviating the interference from the second cellular network, and B) changing operation of the base station for alleviating the interference from the second cellular network.

In the case when the network node is a network management node connected to a base station serving the first cell, the utilizing unit may be further adapted to utilize the determined second interference contribution by at least one of: 1) re-configuring the first cellular network for alleviating the interference from the second cellular network, and 2) ordering the base station to change its operation for alleviating the interference from the second cellular network.

In either of the above cases, changing operation of the base station may comprise at least one of:
- changing antenna azimuth and/or tilt to receive less interference,
- applying receiver filter to suppress interference,
- changing coverage area of the first cell,
- adjusting transmission power for communications in the first cell,
- changing transmission mode in the base station,
- avoiding to connect terminals with deficient receivers, and
- using a more robust modulation and/or coding scheme for communications in the first cell.

While the solution has been described with reference to specific exemplary embodiments, the description is generally only intended to illustrate the inventive concept and should not be taken as limiting the scope of the solution. For example, the terms "network node", "base station", "network management node", "interference contribution", "neighbor cell", "neighbor network", "idle periods" and "TTI" have been used throughout this description, although any other corresponding entities, functions, and/or parameters could also be used having the features and characteristics described here. The solution is defined by the appended claims.

The invention claimed is:

1. A method in a network node of a first cellular network for enabling mitigation of interference in the first cellular network caused by radio communication in a second cellular network, the method comprising:
   - obtaining a total interference in a first cell of the first cellular network,
   - estimating a first interference contribution in the first cell caused by radio communication in the first cellular network,
   - determining a second interference contribution in the first cell caused by radio communication in the second cellular network based on the estimated first interference contribution and the obtained total interference, and
   - utilizing the determined second interference contribution to counteract the interference in the first cell caused by the radio communication in the second cellular network.

2. The method according to claim 1, wherein the second interference contribution is determined by calculating the difference or ratio between the estimated first interference contribution and the obtained total interference.

3. The method according to claim 1, wherein the second interference contribution is utilized to counteract the interference in the first cell when the second interference contribution fulfills a threshold condition.

4. The method according to claim 3, wherein the threshold condition comprises any of: a minimum limit of the second interference contribution, a minimum ratio of the second interference contribution and the first interference contribution, a minimum ratio of the second interference contribution and the total interference, and a minimum level of influence of the interference on communication performance in the first cell.

5. The method according to claim 3, wherein the threshold condition is adaptive depending on traffic load in the first cell.

6. The method according to claim 1, wherein obtaining the total interference and estimating the first interference contribution are performed for idle periods when no terminal is scheduled for radio communication in the first cell.

7. The method according to claim 1, wherein the first interference contribution is estimated to be zero during periods when no terminals are scheduled for radio communication in neighbor cells of the first cellular network adjacent to the first cell.

8. The method according to claim 1, wherein the total interference is obtained by signal measurements in the first cell, and the first interference contribution in the first cell is estimated based on at least one interference indication from at least one neighbor cell.

9. The method according to claim 8, wherein the at least one interference indication comprises at least one of: a bitmap of scheduled Time Transmission Intervals (TTIs), a High Interference Indicator (HII) indicating high expected interference, analysis of downlink measurements, and analysis of uplink signal levels derived from neighbor cell measurements and from used transmit power.

10. The method according to claim 1, wherein the network node is a base station serving the first cell and the action of utilizing the determined second interference contribution comprises at least one of:
   - sending information about the determined second interference contribution to a network management node to enable re-configuration of the first cellular network for alleviating the interference from the second cellular network, and
   - changing operation of the base station for alleviating the interference from the second cellular network.

11. The method according to claim 10, wherein changing operation of the base station comprises at least one of:
   - changing antenna azimuth and/or tilt to receive less interference,
   - applying receiver filter to suppress interference,
   - changing coverage area of the first cell,
   - adjusting transmission power for communications in the first cell,
   - changing transmission mode in the base station,
   - avoiding to connect terminals with "deficient" receivers, and
   - using a more robust modulation and/or coding scheme for communications in the first cell.

12. The method according to claim 1, wherein the network node is a network management node connected to a base station serving the first cell and the action of utilizing the determined second interference contribution comprises at least one of:
   - re-configuring the first cellular network for alleviating the interference from the second cellular network, and
   - ordering the base station to change its operation for alleviating the interference from the second cellular network.

13. The method according to claim 1, wherein the method is performed at predetermined intervals or when triggered by an event comprising any of: the total interference exceeds a predefined value, and the communication performance in the first cell falls below a predefined level.

14. The network node of a first cellular network, the network node being configured to enable mitigation of interference in the first cellular network caused by radio communication in a second cellular network, the network node comprising:
   - an obtaining unit adapted to obtain a total interference in a first cell of the first cellular network, an estimating unit adapted to estimate a first interference contribution in the first cell caused by radio communication in the first cellular network, a logic unit adapted to determine a second interference contribution in the first cell caused by radio communication in the second cellular network based on the estimated first interference contribution and the obtained total interference, and a utilizing unit adapted to utilize the determined second interference contribution to counteract the interference in the first cell caused by the radio communication in the second cellular network.

15. The network node according to claim 14, wherein the logic unit is further adapted to determine the second interference contribution by calculating the difference or ratio between the estimated first interference contribution and the obtained total interference.

16. The network node according to claim 14, wherein the utilizing unit is further adapted to utilize the second interference contribution to counteract the interference in the first cell when the second interference contribution fulfills a threshold condition.

17. The network node according to claim 16, wherein the threshold condition comprises any of: a minimum limit of the second interference contribution, a minimum ratio of the second interference contribution and the first interference contribution, a minimum ratio of the second interference contribution and the total interference, and a minimum level of influence of the interference on communication performance in the first cell.

18. The network node according to claim 14 wherein the obtaining unit and the estimating unit are adapted to obtain the total interference and estimate the first interference contribution, respectively, for idle periods when no terminal is scheduled for radio communication in the first cell.

19. The network node according to claim 14, wherein the estimating unit is further adapted to estimate the first interference contribution to be zero during periods when no terminals are scheduled for radio communication in neighbor cells of the first cellular network adjacent to the first cell.

20. The network node according to claim 14, wherein the obtaining unit is further adapted to obtain the total interference from signal measurements in the first cell, and the estimating unit is further adapted to estimate the first interference contribution in the first cell based on at least one interference indication from at least one neighbor cell.

21. The network node according to claim 20, wherein the at least one interference indication comprises at least one of: a bitmap of scheduled Time Transmission Intervals (TTIs), a High Interference Indicator (HII) indicating high expected interference, analysis of downlink measurements, and analysis of uplink signal levels derived from neighbor cell measurements and from used transmit power.

22. The network node according to claim 14, wherein the network node is a base station serving the first cell and the utilizing unit is further adapted to utilize the determined second interference contribution by at least one of:

sending information about the determined second interference contribution to a network management node to enable re-configuration of the first cellular network for alleviating the interference from the second cellular network, and changing operation of the base station for alleviating the interference from the second cellular network.

23. The network node according to claim 22, wherein changing operation of the base station comprises at least one of:

changing antenna azimuth and/or tilt to receive less interference, applying receiver filter to suppress interference, changing coverage area of the first cell, adjusting transmission power for communications in the first cell, changing transmission mode in the base station, avoiding to connect terminals with deficient receivers, and using a more robust modulation and/or coding scheme for communications in the first cell.

24. The network node according to claim 14, wherein the network node is a network management node connected to a base station serving the first cell and the utilizing unit is further adapted to utilize the determined second interference contribution by at least one of:

re-configuring the first cellular network for alleviating the interference from the second cellular network, and ordering the base station to change its operation for alleviating the interference from the second cellular network.

* * * * *